(12) United States Patent
Yudovsky

(10) Patent No.: US 6,868,859 B2
(45) Date of Patent: Mar. 22, 2005

(54) ROTARY GAS VALVE FOR PULSING A GAS

(75) Inventor: Joseph Yudovsky, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/354,794

(22) Filed: Jan. 29, 2003

(65) Prior Publication Data

US 2004/0144431 A1 Jul. 29, 2004

(51) Int. Cl.$^7$ ............................................. F16K 11/06
(52) U.S. Cl. ...................................... 137/1; 137/624.13
(58) Field of Search ..................... 137/624.13, 625.21, 137/625.31, 1

(56) References Cited

U.S. PATENT DOCUMENTS

| | | | |
|---|---|---|---|
| 4,058,430 A | 11/1977 | Suntola et al. .............. 156/611 |
| 4,389,973 A | 6/1983 | Suntola et al. .............. 118/725 |
| 4,413,022 A | 11/1983 | Suntola et al. ............. 427/255.2 |
| 4,834,831 A | 5/1989 | Nishizawa et al. ......... 156/611 |
| 4,953,595 A | * 9/1990 | Kotlyar ................. 137/624.13 |
| 4,993,357 A | 2/1991 | Scholz ........................ 118/715 |
| 5,225,366 A | 7/1993 | Yoder .......................... 437/108 |
| 5,281,274 A | 1/1994 | Yoder .......................... 118/697 |
| 5,294,286 A | 3/1994 | Nishizawa et al. ......... 156/610 |
| 5,316,042 A | * 5/1994 | Lim et al. ............... 137/625.11 |
| 5,353,838 A | * 10/1994 | Grant ..................... 137/624.13 |
| 5,374,570 A | 12/1994 | Nasu et al. .................... 437/40 |
| 5,441,703 A | 8/1995 | Jurgensen ................... 422/129 |
| 5,443,647 A | 8/1995 | Aucoin et al. ....... 118/723 ME |
| 5,480,818 A | 1/1996 | Matsumoto et al. .......... 437/40 |
| 5,483,919 A | 1/1996 | Yokoyama et al. ........... 117/89 |
| 5,503,875 A | 4/1996 | Imai et al. ................ 427/255.3 |
| 5,674,786 A | 10/1997 | Turner et al. ................ 437/225 |
| 5,711,811 A | 1/1998 | Suntola et al. .............. 118/711 |
| 5,796,116 A | 8/1998 | Nakata et al. ................. 257/66 |
| 5,807,792 A | 9/1998 | Ilg et al. ..................... 438/758 |
| 5,835,677 A | 11/1998 | Li et al. ...................... 392/401 |
| 5,855,680 A | 1/1999 | Soininen et al. ............. 118/719 |
| 5,879,459 A | 3/1999 | Gadgil et al. ................ 118/715 |
| 5,913,329 A | * 6/1999 | Haynes et al. ......... 137/624.13 |
| 5,916,365 A | 6/1999 | Sherman ....................... 117/92 |
| 6,015,590 A | 1/2000 | Suntola et al. .......... 427/255.23 |
| 6,042,652 A | 3/2000 | Hyun et al. .................. 118/719 |
| 6,139,700 A | 10/2000 | Kang et al. .............. 204/192.17 |
| 6,174,377 B1 | 1/2001 | Doering et al. ............. 118/729 |
| 6,183,563 B1 | 2/2001 | Choi et al. ................... 118/715 |
| 6,200,893 B1 | 3/2001 | Sneh .......................... 438/685 |
| 6,231,672 B1 | 5/2001 | Choi et al. ................... 118/715 |
| 6,270,572 B1 | 8/2001 | Kim et al. ..................... 117/93 |
| 6,305,314 B1 | 10/2001 | Sneh et al. ............. 118/723 R |
| 6,306,216 B1 | 10/2001 | Kim et al. ................... 118/725 |
| 6,447,607 B2 | 9/2002 | Soininen et al. ............. 117/200 |
| 6,478,872 B1 | 11/2002 | Chae et al. .................... 117/88 |
| 6,481,945 B1 | 11/2002 | Hasper et al. ............... 414/217 |
| 6,511,539 B1 | 1/2003 | Raaijmakers ............... 117/102 |
| 6,551,406 B2 | 4/2003 | Kilpi .......................... 118/728 |

(List continued on next page.)

FOREIGN PATENT DOCUMENTS

| | | | |
|---|---|---|---|
| EP | 1167569 | 1/2001 | ......... C23C/16/455 |
| JP | 58-098917 | 6/1983 | ......... H01L/21/205 |
| JP | 05-047666 | 2/1993 | ......... H01L/21/205 |
| JP | 05-206036 | 8/1993 | ......... H01L/21/205 |
| JP | 05-234899 | 9/1993 | ......... H01L/21/205 |
| JP | 04-291916 | 10/1993 | ......... H01L/21/205 |
| JP | 05-270997 | 10/1993 | ........... C30B/29/68 |

(List continued on next page.)

Primary Examiner—Kevin Lee
(74) Attorney, Agent, or Firm—Moser Patterson & Sheridan

(57) ABSTRACT

A gas valve for pulsing a gas comprises a housing having at least one inlet port, an outlet port, and a selector disk mounted in the housing and comprising at least one timing slot, wherein rotation of the selector disk periodically couples at least one inlet port to the outlet port through the timing slot.

29 Claims, 7 Drawing Sheets

U.S. PATENT DOCUMENTS

| | | |
|---|---|---|
| 2001/0000866 A1 | 5/2001 | Sneh et al. ............ 118/723 IR |
| 2001/0009140 A1 | 7/2001 | Bondestam et al. ........ 118/725 |
| 2001/0011526 A1 | 8/2001 | Doering et al. ............. 118/729 |
| 2001/0013312 A1 | 8/2001 | Soininen et al. .............. 117/86 |
| 2001/0014371 A1 | 8/2001 | Kilpi ..................... 427/255.28 |
| 2001/0042523 A1 | 11/2001 | Kesala ....................... 122/6.6 |
| 2001/0042799 A1 | 11/2001 | Kim et al. .................. 239/553 |
| 2001/0054377 A1 | 12/2001 | Lindfors et al. ............ 117/104 |
| 2002/0000196 A1 | 1/2002 | Park .......................... 118/715 |
| 2002/0007790 A1 | 1/2002 | Park .......................... 118/715 |
| 2002/0041931 A1 | 4/2002 | Suntola et al. ......... 427/255.28 |
| 2002/0052097 A1 | 5/2002 | Park .......................... 438/507 |
| 2002/0086106 A1 | 7/2002 | Park et al. ............... 427/248.1 |
| 2002/0092471 A1 | 7/2002 | Kang et al. ................. 118/715 |
| 2002/0094689 A1 | 7/2002 | Park .......................... 438/694 |
| 2002/0108570 A1 | 8/2002 | Lindfors .................... 118/715 |
| 2002/0134307 A1 | 9/2002 | Choi .......................... 118/715 |
| 2003/0004723 A1 | 1/2003 | Chihara ...................... 704/260 |
| 2003/0075273 A1 | 4/2003 | Kilpela et al. ......... 156/345.33 |
| 2003/0075925 A1 | 4/2003 | Lindfors et al. ............ 285/367 |

FOREIGN PATENT DOCUMENTS

| | | | |
|---|---|---|---|
| JP | 06-224138 | 8/1994 | ......... H01L/21/205 |
| JP | 2000-319772 | 11/2000 | ........... C23C/14/24 |
| JP | 2001-020075 | 1/2001 | ........... C23C/16/44 |
| WO | 96/17107 | 6/1996 | ........... C23C/16/44 |
| WO | 99/01595 | 1/1999 | ........... C30B/25/14 |
| WO | 99/65064 | 12/1999 | ........... H01L/21/00 |
| WO | 00/54320 | 9/2000 | ........... H01L/21/44 |
| WO | 00/79576 | 12/2000 | ........ H01L/21/205 |
| WO | 01/17692 | 3/2001 | ........... B05C/11/00 |
| WO | 01/36702 | 5/2001 | ........... C23C/16/00 |
| WO | WO 02/08488 | 1/2002 | ........... C23C/16/44 |

* cited by examiner

US 6,868,859 B2

ROTARY GAS VALVE FOR PULSING A GAS

BACKGROUND OF THE INVENTION

1. Field of the Invention

The present invention generally relates to semiconductor substrate processing systems. More particularly, the present invention relates to a gas valve for pulsing of one or more gases used in a semiconductor substrate processing system.

2. Description of the Related Art

In cylindrical film processing, for example, atomic layer deposition, atomic layer etch or other repetitive, thin film deposition or etch process, it is desirable to provide rapid and precise cycling of process gases to improve the production worthiness of processing systems. In this regard, valves that may reliably inject small amounts of materials at rapid rates are needed. Some current and desired cylindrical layer deposition processes will require injection sequences wherein a single pulse may be as short as a few tens of milliseconds and be separated from an adjacent pulse by a few tens of milliseconds. Providing such pulses of gas using conventional solenoid or pneumatically operated valves have not proven desirable for this use due to insufficient responsiveness, i.e., long cycle times, failure to shut off cleanly, high rate of particulate generation and poor reliability and short service life. These deficiencies lead to suboptimal physical properties of the positive films, short service life and high maintenance frequencies.

Therefore, there is a need for a valve for pulsing gas during cylindrical processes such as atomic layer deposition and the like.

SUMMARY OF THE INVENTION

The present invention is a rotary gas valve for pulsing gases (or gas mixtures). The inventive gas valve comprises a plurality of gas inlet ports and one gas outlet port that are periodically engaged in fluid communication by a rotating selector disk. The selector disk comprises at least one timing slot to establish and terminate a flow of each gas (or gas mixture). In one embodiment, the inventive gas valve produces pulses having a duration of about 50 to 300 msec of four gases. In one application, the invention is used for pulsing reactive precursor and purge gases during an atomic layer deposition process performed in a semiconductor substrate processing system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a rotary gas valve for pulsing one or several gases (or gas mixtures) to form a sequence of pulses of the gas. Herein the terms gas and gas mixture are used interchangeably. The gases are supplied to the gas valve in a non-pulsed form, as a plurality of individual pressurized gases. The gas valve comprises a plurality of gas inlet ports and one gas outlet port. The gas inlet ports are sequentially engaged in fluid communication with the gas outlet port by a rotating selector disk. The selector disk comprises at least one timing slot. When the selector disk rotates, the timing slot periodically establishes and terminates a flow from the gas outlet port of each gas that is plumbed to the gas valve. As such, the rotary motion of the selector disk results in pulsing of the gas from the gas outlet port. In one exemplary application, the invention is used for pulsing of gases during a cyclical deposition process such as an Atomic Layer Deposition (ALD) process that is performed in a semiconductor substrate processing system.

Figure 1:
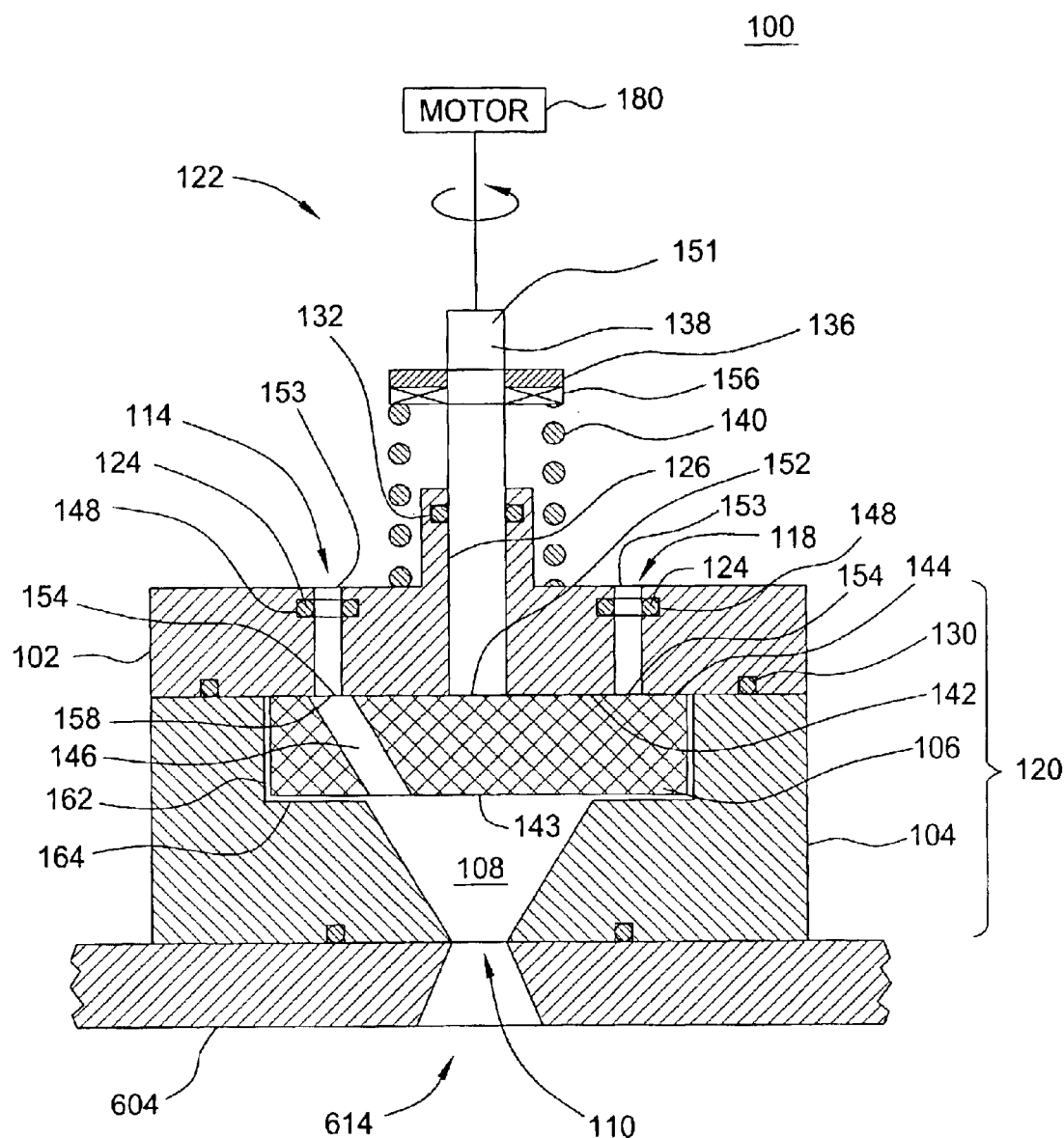
FIG. 1 is a schematic, cross-sectional view of a gas valve in accordance with one embodiment of the present invention.
Figure 2:
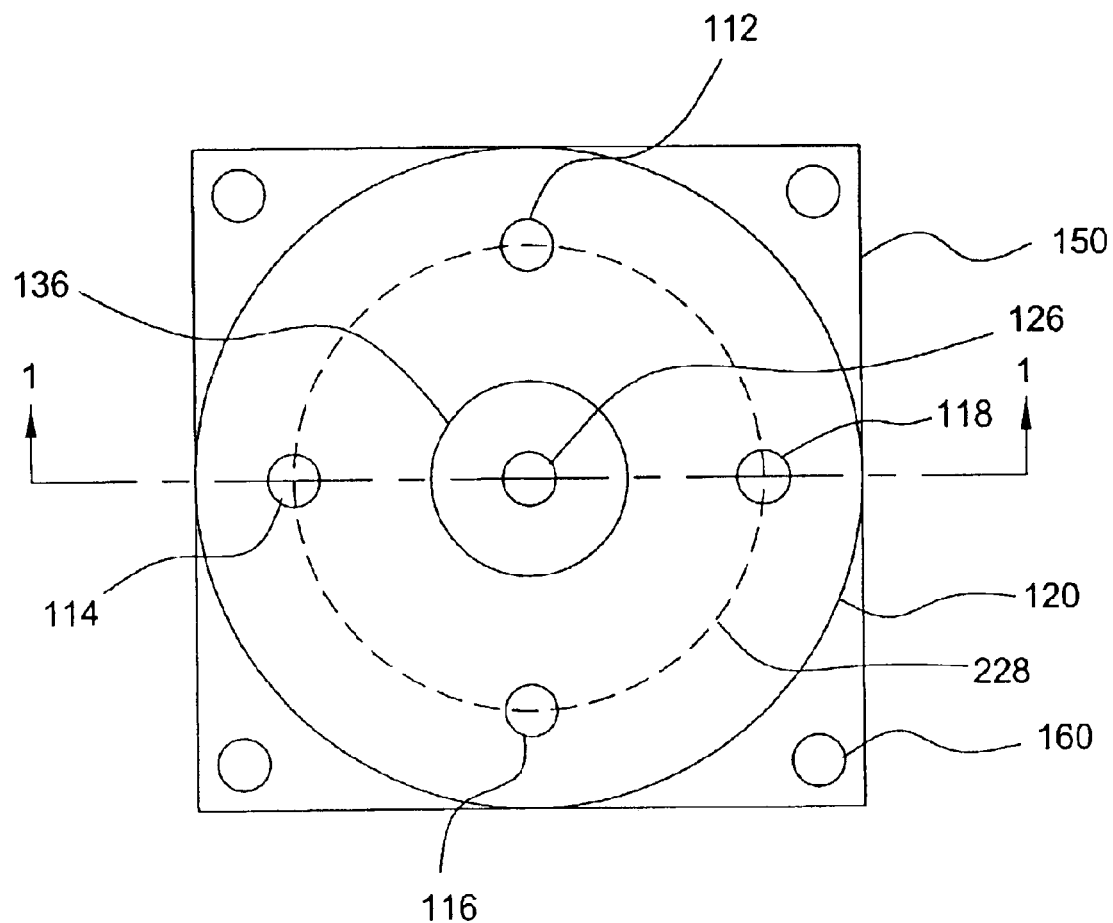
FIG. 2 is a schematic, top plan view of the gas valve of FIG. 1.
Figure 3:
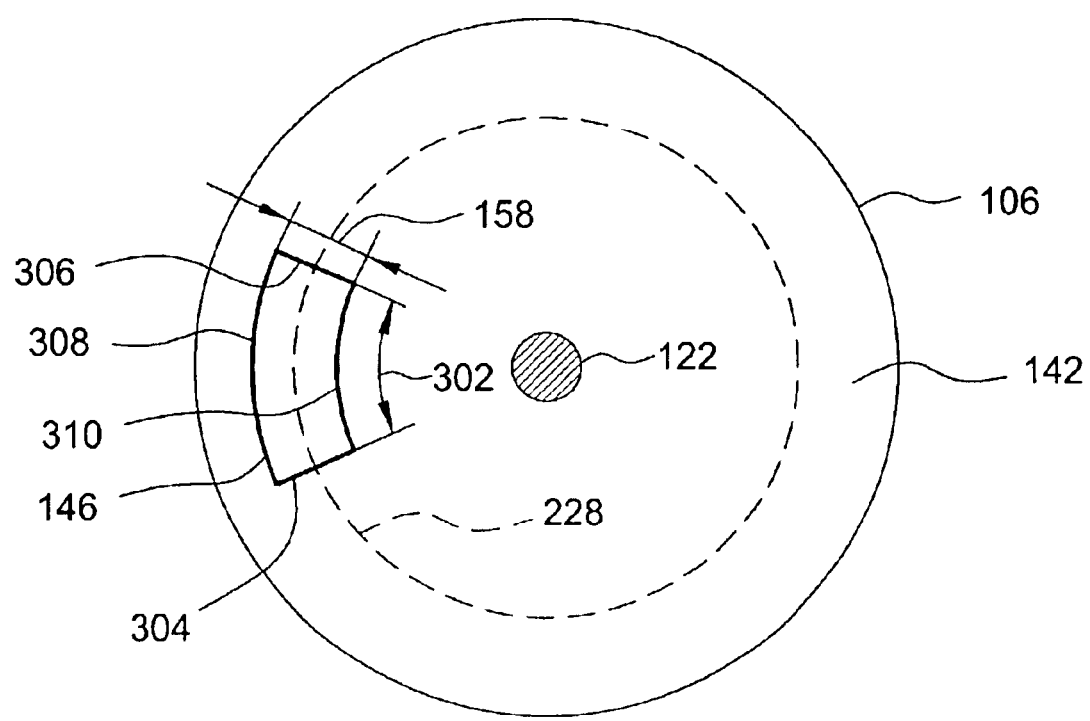
FIG. 3 is a top plan view of one embodiment of a selector disk of the gas valve of FIG. 1.

FIG. 1 and FIG. 2 are, respectively, schematic, cross-sectional and top plan views of a rotary gas valve 100 in accordance with one embodiment of the present invention. The cross-sectional view in FIG. 1 is taken along a centerline 1—1 in FIG. 2. FIG. 3 is a schematic, top plan view of one embodiment of a selector disk 106. For best understanding of this embodiment of the invention, the reader should refer simultaneously to FIGS. 1–3. The images in FIGS. 1–3 are simplified for illustrative purposes and are not depicted to scale.

The rotary gas valve 100 comprises at least one gas channel 112, 114, 116, and 118 that form inlet ports for the valve, a mounting flange 150, a valve chamber 108, an outlet port 110, a housing 120, and an actuator assembly 122. The actuator assembly 122 comprises a shaft 138, a rotateable selector disk 106, a flange 136, a bearing 156, and a bias member (e.g., a spring) 140.

The mounting flange 150 is supplied with a plurality of openings 160 or similar means for mounting the valve 100 upon a gas receiving assembly. The gas receiving assembly comprises apparatus that utilizes the pulsed gases. One embodiment of such an apparatus is a semiconductor wafer processing chamber that is disclosed below with respect to FIG. 6. The outlet port 110 couples the valve chamber 108 to the gas receiving assembly. In one embodiment, the valve chamber 108 has an internal volume in a range of about 1 to 3 cm$^3$ or less. The valve 100 having chamber 108 with small internal volume can produce pulses of gas rapidly, i.e., at a high rate, as well as produce pulses having substantially sharp leading and trailing edges. Gas dosing may be accomplished using control of pressure and flow rate of gases provided to the valve 100 during an ALD process (discussed in reference to FIG. 6 below), as well as controlling velocity of rotation of the reciprocating selector disk 106.

In one embodiment of the invention, the housing 120 comprises an inlet portion 102 and an outlet portion 104. The inlet portion 102 comprises at least one gas channel that defines a gas inlet port. In one embodiment, the inlet portion comprises four gas channels 112, 114, 116, and 118. Each gas channel is adapted for passing of one gas through inlet portion 102 of the housing 120 to the selector disk 106. In an alternative embodiment, the number of channels may be either less or greater than four. Each gas channel has an inlet 153 and an outlet 154. To facilitate a predetermined rate of changes in a gas flow through the valve 100, the outlet 154 may have various form factors such a circular, a rectangular with right angle or rounded corners, and the like. In one embodiment, the outlets 154 of each channel 112, 114, 116, and 118 are placed along a circle 228, which is a centerline of the rotary motion of a timing slot 146 of the selector disk 106 (described in reference to FIG. 3 below). Generally, a gas channel, other than in a portion related to the outlet 154, has a substantially circular form factor. An axis of the gas channel may form either a right angle (as depicted in FIG. 1 and FIG. 2) or an acute or obtuse angle with the inner surface 144 of the housing 120. Those skilled in the art will appreciate that a gas channel may have other form factors or other inclinations.

A groove 148 is located near the inlet 153 of each channel 112, 114, 116, and 118. The groove 148 supports a sealing element 124 that is adapted to provide a vacuum-tight coupling to an external gas line that delivers a respective gas to the inlet of the gas channel. The sealing element 124 may comprise at least one vacuum-grade O-ring, a vacuum-tight fitting, and the like. The vacuum-grade O-ring generally is formed from a polymeric material such as synthetic or natural rubber, a metal or metal alloy, and the like. Other forms of vacuum couplers may be used to connect the channels to various gas suppliers. Furthermore, the inlet may additionally comprise a vacuum-tight shut-off valve to isolate a gas channel from the external environment when the gas channel is not used during a specific deposition process, e.g., the ALD process.

The outlet portion 104 of the housing 120 comprises a seal 124 and the inlet portion 102 of the housing 120 comprises seals 130 and 132. The seals protect the interior of the valve 100 from the external environment. The seals 124 and 130 are static seals. The seal 124 provides a vacuum-tight coupling between the valve body 102 and the gas receiving assembly and the seal 130 provides a vacuum-tight coupling between the inlet portion 102 and the outlet portion 104 of the housing 120. The seal 132 is a rotary seal that provides a vacuum-tight coupling between the shaft 138 and a shaft guide 126 through the inlet portion 102. In one embodiment, each of the seals 130, 132, and 124 comprises at least one vacuum-grade O-ring and a slot for receiving the O-ring. In an alternative embodiment, at least one of the seals 130, 132, and 124 may be a pumped or double-pumped seal.

The parts of the valve 100 that may be exposed to a chemically aggressive gases, e.g., a reactive precursor gas used during a cyclical deposition process, generally are fabricated from or coated with chemically resistant materials that do not substantially react with such gases. In one embodiment, examples of such chemically resistant materials comprise polytetrafluoroethylene (PTFE), polychlorotriflouroethylene (PCTFE), perfluoroalkoxy (PFA), polyimide, and the like. In other embodiments, other materials may be used such as ceramic, a metal, a metal alloy, and the like.

In some applications, during a deposition process, the valve body 102 is maintained at a temperature of about 90 degrees Celsius to prevent condensation of the gas(es) inside the valve. One of materials that is resistant, at such temperatures, to many conventional reactant gases (e.g., comprising ammonia ($NH_4$)) is polyimide VESPEL® CR-6100, which is available from DuPont Company, Wilmington, Del.

In some applications, during a deposition process, the housing 120 may be heated to and further maintained at a temperature of about 90 degrees Celsius to prevent condensation of the gas(es) inside the valve. One of materials that is resistant, at such temperatures, to many conventional reactant gases (e.g., comprising ammonia ($NH_4$)) is polyimide VESPEL® CR-6100, which is available from DuPont Company, Wilmington, Del. The valve 100 may further be adapted to means of heating and/or cooling the internal parts of the valve, as well as the gases within the valve to accommodate various processing requirements. Such means (not shown) may comprise an external heating element (e.g., a flexible resistive heater), embedded electrical heaters (e.g., heaters disposed around the valve chamber 108), and the like, as well as a cooling/heating plumbing (e.g. liquid containing conduit) that is thermally coupled to the housing 120.

The actuator assembly 122 controls the axial and angular positions of the selector disk 106. During operation, the assembly actuator 122 performs a rotary motion and may also perform minor reciprocating motions during the assembly and adjustments of the valve 100. The shaft 138 is disposed in the shaft guide 126 wherein it has a rotary degree of freedom and may also move in the axial direction. A first end 152 of the shaft 138 is concentrically coupled to the selector disk 106. In an alternative embodiment, the shaft 138 and the selector disk 106 are formed as a single part. A second end 151 of the shaft 138 is coupled to a rotary drive (e.g., motor 180) that applies a rotary motion to the actuator assembly 122. In one embodiment, the rotary drive may comprise a compensator coupling and a motor, e.g., a controlled electro-mechanical motor, a stepper motor, and the like. Alternatively, the compensator may be a part of the motor. The compensator provides a degree of freedom to the actuator assembly 122 for a motion in the axial direction in response to the elastic force of the bias member 140, as discussed below. The compensator may comprise a membrane, a sliding coupling, and the like.

Referring to FIG. 1, the bias member 140 generally is formed as a cylindrical spring and disposed substantially around the shaft 138. The bias member 140 is compressed between the housing 120 and the flange 136. As such, the bias member 140 is compressively preloaded. The bias member 140 may comprise at least one concentric spring element, a plurality of spring elements disposed along a circle surrounding the shaft 138, and the like. In one embodiment, the flange 136 is coupled to the shaft 138. Alternatively, the shaft 138 and the flange 136 may be formed as a single part. In one further embodiment, the flange 136 comprises a thrust bearing 156 facing the bias member 140. In this embodiment, the bearing 156 facilitates a stationary position of the bias member 140 during a rotary motion of the shaft 138 and flange 136. In another embodiment, the elastic force of the bias member 140 is adjusted by selecting a stiffness of the spring and/or a position of the flange 136 on the shaft 138. The position of the flange 136 may be fixed thereafter, e.g., using a set screw (not shown) and the like. The flange 136 may also be threaded onto the end 151 of the shaft 138 to establish a position along the length of the shaft 138. A locking nut (not shown) may be used to fix the position of the flange 136.

The preloaded bias member 140 exerts an expanding elastic force that is applied to the actuator assembly 122 along the axis of rotation of the selector disk 106. The force causes the selector disk 106 to move, e.g., slide, until a physical contact with the housing 120 is established. Specifically, the elastic force of the bias member 140 uniformly pushes the surface 142 of the selector disk 106 against the inner surface 144 of the inlet portion 102 of the housing 120. The surfaces 142 and 144 are formed in a manner that, when pushed against each other by the elastic force of the bias member 140, they form a rotary, vacuum-tight coupling between the solid portions of the surfaces. Such coupling represent a compressive rotary seal 132 that isolates the outlets 154 of gas channels 112, 114, 116, and 118 from one another. Further, in operation, the rotary seal 132 isolates the valve chamber 108 from the gas channels that momentarily do not coincide with the rotating timing slot 146 (discussed in reference to the rotary motion of the timing slot 146 below). In another embodiment, a sealing contact between the surfaces 142 and 144 is formed using fine machining of the surfaces (e.g., using plane-parallel polishing and the like).

The selector disk 106 is sized to form gaps 162 and 164 between the disk and the opposing surfaces of the valve chamber 108 to facilitate the rotation motion of the selector disk.

In an alternative embodiment, the bias member 140 comprises bearings that rotationally support the shaft 138 within the shaft guide 126 and maintains contact between the selector disk 106 and the housing 120. In further embodiments, any apparatus or element is considered a bias member 140 that facilitates rotation of the disk 106 and maintains adequate seal between the disk and the housing to promote gas flow through the valve.

Referring to FIG. 3, the selector disk 106 comprises at least one timing slot 146 that is positioned substantially along the concentric circle 228 (depicted as a dashed line). In other embodiments, the selector disk 106 may comprise a plurality of timing slots wherein each timing slot is formed, disposed, and operates similar to the slot 146.

The timing slot 146 may be formed using conventional machining techniques such as milling, molding, and the like. In one embodiment, the timing slot 146 has a smallest width 158 that is greater than any width (e.g., a diameter) of the outlet 154 (as shown in FIG. 1). In the depicted embodiment, the slot is substantially an accurate rectangular. Other shapes of the timing slot may also be used, e.g., square, circular, rectangular, and the like. In a further embodiment, the walls of the timing slot 146 are sloping downwardly towards the outlet port 110 (as shown in FIG. 1) to increase gas conductance in a flow path through the timing slot 146. Further, edges 304 and 306 of the timing slot 146, as well as sides 308 and 310, may be profiled. As such, in operation, the timing slot 146 can facilitate a predetermined rate of changes in a gas flow through the valve 100, e.g., smooth transition between the ON and OFF periods (discussed in reference to FIGS. 4 and 5A, 5B below). In one embodiment, the edges 304 and 306 have outward directed slopes, i.e., the timing slot 146 has a length on a surface 143 of the selector disk 106 that is greater than a length 302 of the slot on the surface 142.

In operation of one embodiment of the invention, the selector disk 106 rotates generally in one direction, with a substantially constant angular velocity. Alternatively, the direction and angular velocity of rotation may be periodically adjusted. During a continuous rotary motion, the timing slot 146 sequentially passes the outlets of the gas channels 112, 114, 116, and 118. In one embodiment, the timing slot 146 has a form factor that allows the slot to coincide with the outlet 154 or overlap the outlet during the rotary motion of the selector disk 106. In operation, the timing slot 146, in a cyclical order, sequentially passes the outlets of the gas channels.

When the timing slot 146 momentarily coincides with the outlet 154 of a gas channel 112, 114, 116, or 118, the gas provided to that channel may freely flow through the timing slot 146 into the valve chamber 108 and to the outlet port 110. As such, when the timing slot 146 coincides with the outlet, the selector disk 106 establishes a momentarily state of fluid communication between the inlet of the respective gas channel and a recipient port for the pulsed gas.

In one embodiment, the inlets and outlets of the gas channels 112, 114, 116, and 118 are judicially disposed substantially along the concentric circle 228 in an order in which the respective gases should be delivered into the outlet port 110 (with respect to a direction of rotation of the selector disk 106). Alternatively, only the outlets of the gas channels are disposed along the circle 228 in such order.

When the timing slot 146 rotates, it sequentially establishes and terminates a flow of gas from the gas channel it passes. As such, the motion of the selector disk 146 forms a pulse of gas from that gas channel into the valve chamber 108. From the valve chamber 108, the pulse of gas may propagate through the outlet port 110 into a recipient port for the pulsed gas.

Similarly, a continued rotation of the timing slot 146 creates a pulse of gas from the adjacent gas channel in the direction of the rotation or, specifically, from the gas channel having an outlet positioned adjacent the outlet of the previously passed gas channel. In operation, the timing slot 146 periodically couples a gas channel and the valve chamber 108 and such coupling creates a pulse of gas from that channel of the valve 100. A number of pulses increases per unit of time as the selector disk 106 rotates faster.

In one embodiment, the length 302 of the timing slot 146 may be less than a distance between the outlets of the gas channels. In this embodiment, as the selector disk 140 rotates, the entire timing slot 146 becomes momentarily positioned between the outlets of the adjacent channels such that none of the channels is currently in fluid communication with the slot. A period of time from a moment when the timing slot 146 terminates a flow of gas from a preceding gas channel to a moment the slot 146 begins establishing of the flow of gas from the adjacent gas channel relates to a cutoff period between the pulses of gases (discussed in reference to FIG. 5A below). Thus, a time duration can be established wherein no gas flows to the output port 110.

In an alternative embodiment, the length 302 of the timing slot 146 may be greater than a distance between the adjacent gas channels. In this embodiment, as the selector disk 106 rotates, the timing slot 146 may begin coinciding with a position of an outlet of the next gas channel prior to termination of flow of the gas from the preceding gas channel. Such position of the timing slot 146 relates to a momentary state of simultaneous fluid communication between such adjacent gas channels and the valve chamber 108. Such a state results in overlapping of pulses of gases from the adjacent channels (discussed in reference to FIG. 5B below).

In operation, when the selector disk 106 rotates at an angular velocity of W revolutions per second, the timing slot 146 sequentially connects the gas channels 112, 114, 116, and 118 to the valve chamber 108. A duration of connection relates to a duration of a pulse of gas from a respective gas channel. The duration of the pulse is $T_1=(L_{TS}+D)/CW$, where C is a length of the circle 228, D is a largest width of the outlet of the gas channel, and $L_{TS}$ is a length of the timing slot 146 (both D and $L_{TS}$ are measured along the circle 228). The next pulse of gas from the same gas channel begins upon expiration of a period $T_2=1/W-T_1$. Accordingly, a pulse of gas from the gas channel M that is positioned next to the gas channel N in the direction of rotation of the selector disk 106 begins upon expiration of a period $T_3= (\Delta L_{MN}-D-L_{TS})/CW$, where $\Delta L_{MN}$ is a distance between the channels N and M, as measured along the circle 228. When the gas channels are evenly disposed along the circle 228, all distances between the gas channels are equal one another and $T_3=[\Delta L-(L_{TS}+D)]/CW$, where $\Delta L$ is a distance between the adjacent channels. The periods $T_3$ may have either a positive value (i.e., $T_3>0$) or at least one of the periods $T_3$ may have a negative value (i.e., $T_3<0$). A positive value of $T_3$ relates to an embodiment that has a gas cutoff period between pulses of gas from the adjacent gas channels N and M (discussed in reference to FIG. 5A below). A duration of the gas cutoff period is $T_3$. Similarly, a negative value of $T_3$ relates to an embodiment in which pulses of gases from the adjacent channels N and M may overlap one another during the period $T_3$ (discussed in reference to FIG. 5B below).

Figure 4:
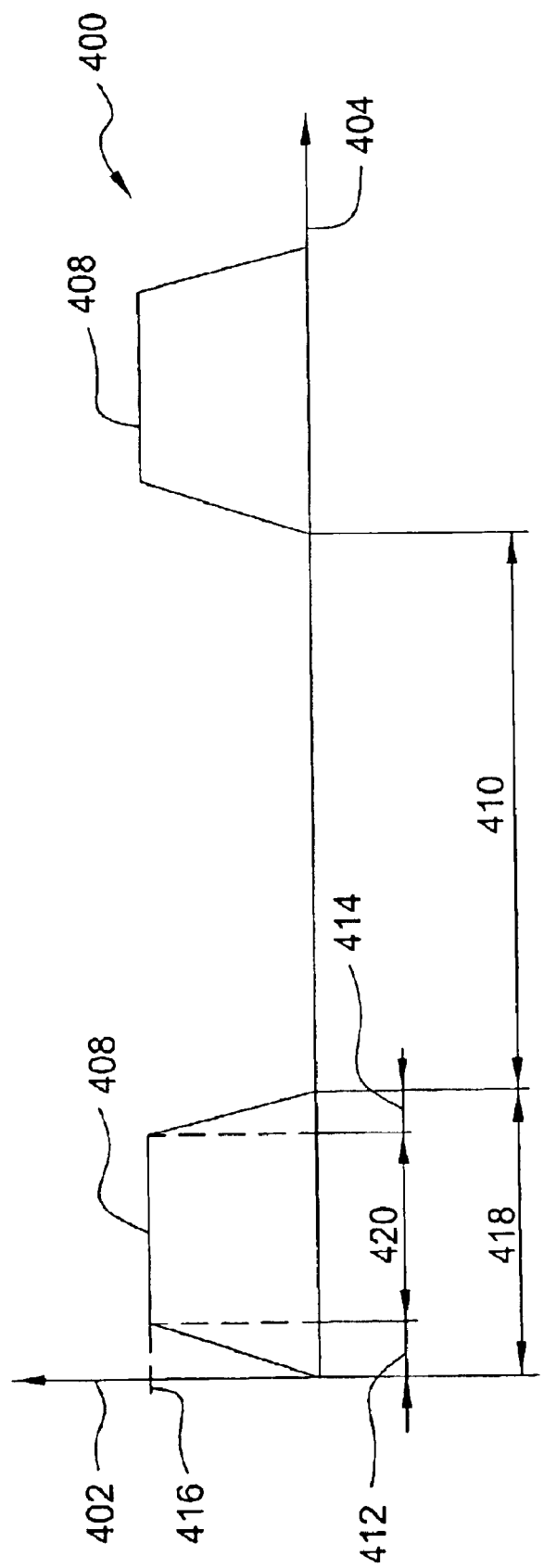
FIG. 4 is an exemplary graph of a pulse of gas produced by the valve of FIG. 1.

FIG. 4 is an exemplary graph of a responsiveness R of the gas valve 100. The term "responsiveness" as used herein relates to a value $R=1/(T_4+T_5)$, where $T_4$ and $T_5$ are time periods needed to stabilize a gas flow through the valve during a pulse of gas at the beginning and at the end of the pulse, respectively. Specifically, a graph 400 depicts a value of a flow of gas through the output port 110 (axis 402) versus time (axis 404). In should be noted that images in FIG. 4 are simplified and not depicted to scale.

In operation, the flow of the gas from a gas channel is cyclically pulsed by the timing slot 146. Each pulse 408 has a duration 418 of $T_1$ and a period 410 between the pulses 408 has a duration of $T_2$. The pulse 408 comprises a leading edge 412 having a duration $T_4$, a trailing edge 414 having a duration $T_5$, and a steady state period 420 related to a flow rate 416. The period 412 relates to transition of the gas flow from the OFF state (i.e., no gas flow) to the ON state (i.e., a gas flow at the rate 416) as defined by a position of the rotating timing slot 106 with respect to the position of an outlet of the gas channel. Similarly, the period 414 relates to the transition from the ON state to the OFF state. The shape of the pulse and the rate of pulsing is referred to herein as the responsiveness profile.

The valve 100 having a greater value of the responsiveness R may produce more pulses 408 over a period time, i.e., may form the pulses of gas at a higher rate. The responsiveness of the valve 100 increases when increasing gas conductance through the gas path collectively formed by a gas channel, the timing slot 146, the valve chamber 108, and the outlet 110. Further, the responsiveness of the valve 100 increases when the internal volume of the gas valve 100 decreases. When the timing slot 146 and the outlets of the gas channels have a form factor wherein the front and back edges are perpendicular to a direction of rotation of the selector disk 106, the responsiveness of the gas valve 100 also increases.

It should be noted that the valve 100 does not have any limitation for a maximum duration of pulses of gas that the valve produces. A duration of the pulses may be increased, e.g., by decreasing an angular velocity of rotation of the selector disk 106. Also, by modulating the velocity of the disk 106 as the timing slot 146 coincides with a channel, the responsiveness profile may be altered for the leading and trailing edges of the gas pulse. Such modulation can be applied to each channel such that the responsiveness profile may vary for each gas.

In one embodiment, the timing slot 146 has a form factor wherein the front and back edges are orthogonal to the direction of rotation of the selector disk 106. In a further embodiment, the outlets of the gas channels 112, 114, 116, and 118 have a rectangular form factor wherein the longest width is positioned perpendicular to the circle 228. In such embodiments, the responsiveness of the gas valve 100 also increases. Tailoring the physical shape of the slot edges enables specific responsiveness profile to be formed.

Figure 5A:
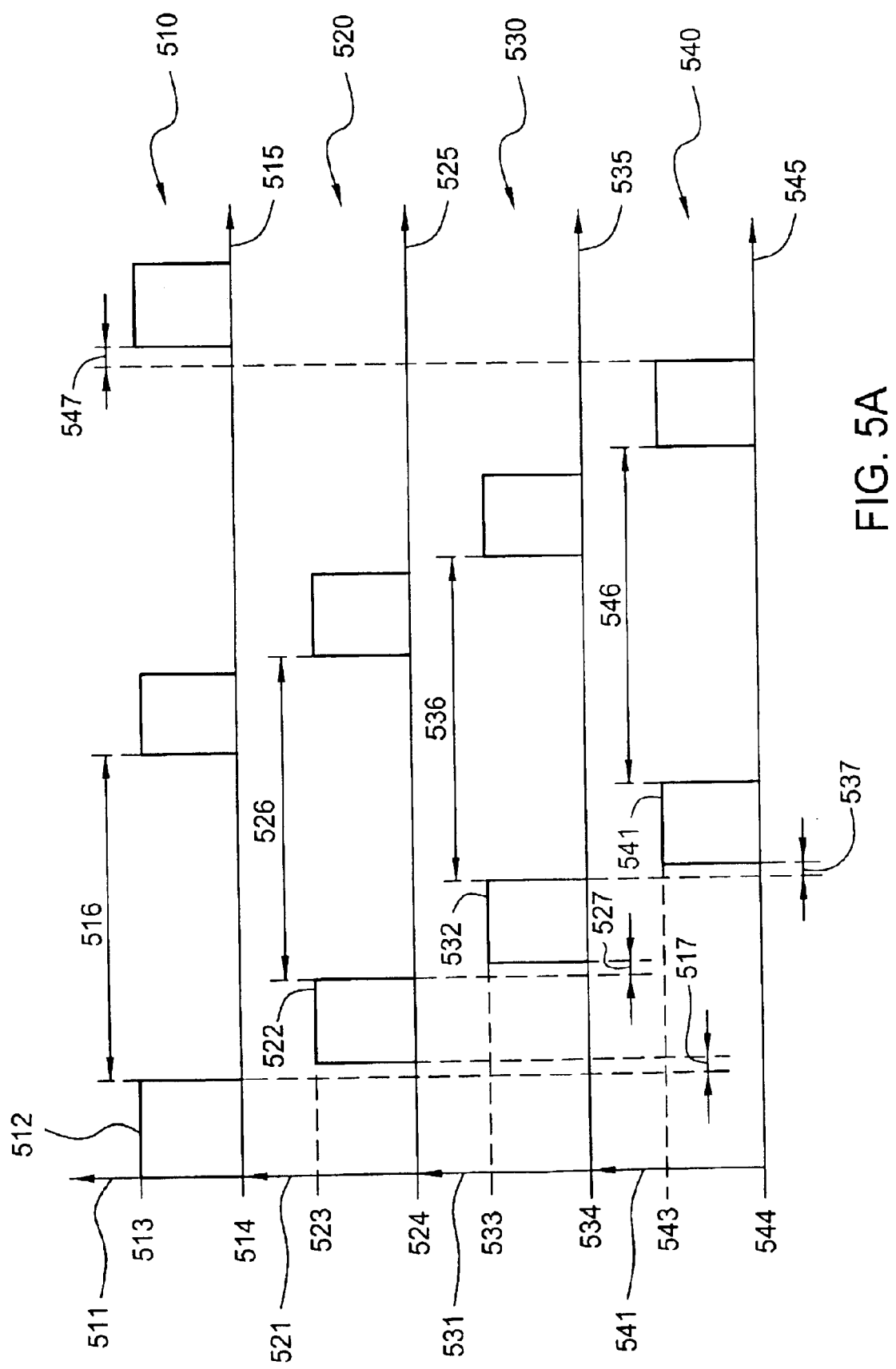
FIGS. 5A and 5B are exemplary graphs of illustrative timing diagrams of the gas valve of FIG. 1.
Figure 5B:
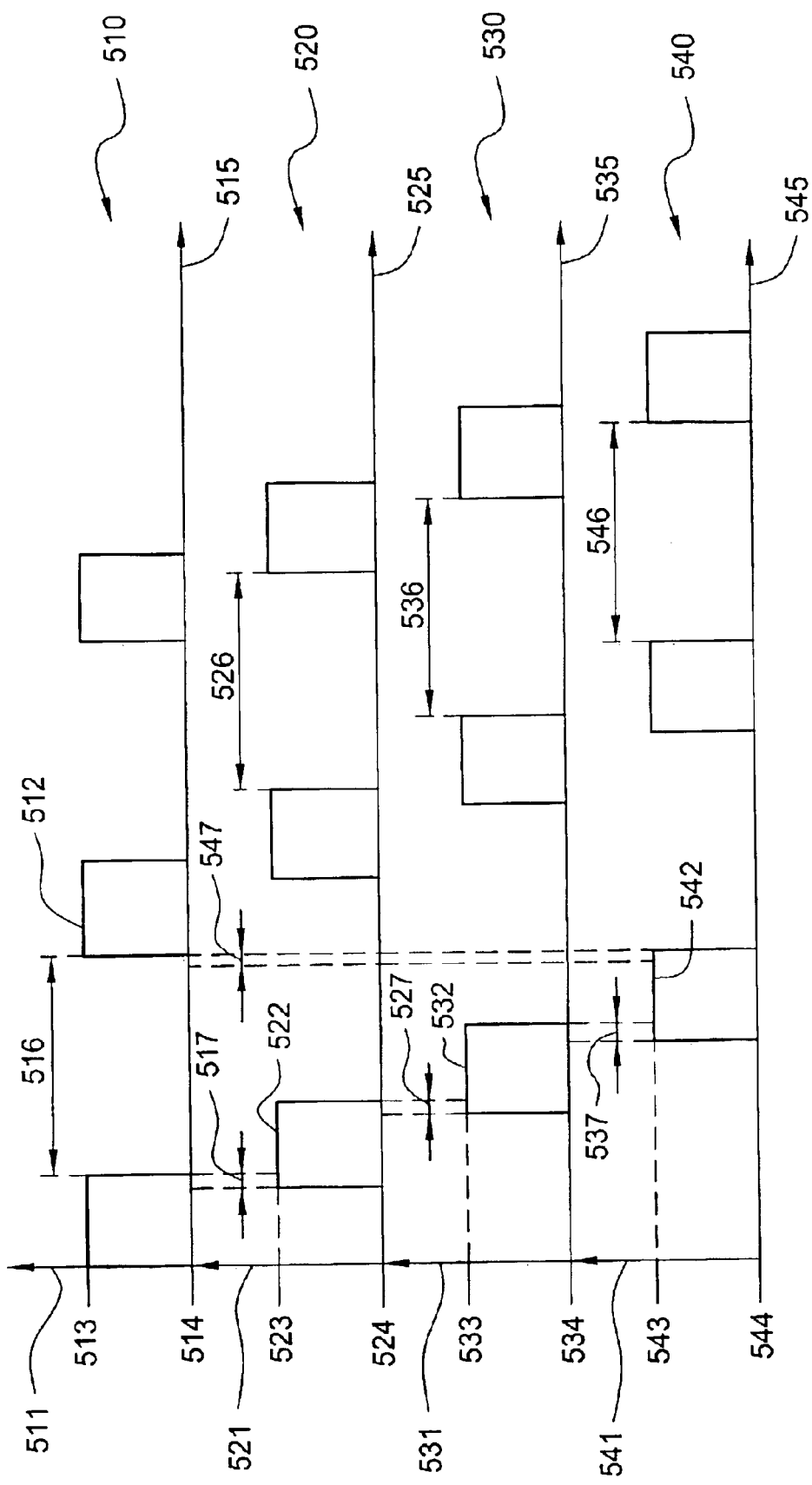

FIGS. 5A and 5B are exemplary graphs of illustrative timing diagrams of pulses of gases produced by the gas valve 100. In FIGS. 5A and 5B, for purposes of clarity, a graphical image of a pulse of gas is reduced to a rectangular shape. Further, the gas channels are assumed to be evenly disposed in the direction of traveling of the timing slot 146 that sequentially passes the outlets of the gas channels starting from the channel 114, and rotation of the selector disk 106 is assumed to be constant. For this embodiment, similar to FIG. 4, the images in FIGS. 5A and 5B are not depicted to scale.

FIG. 5A relates to an embodiment of the gas valve 100 comprising a selector disk 106 having the timing slot 146 which length $L_{TS}$ is less than the distance $\Delta L$ between the adjacent gas channels. Similarly, FIG. 5B relates to an embodiment of the gas valve 100 comprising a selector disk 106 having the timing slot 146 which length $L_{TS}$ is greater than a distance between $\Delta L$ the adjacent gas channels. Other permissible timing diagrams of pulses produced by the gas valve 100 become readily available to one skilled in the art after reviewing the graphs depicted in FIGS. 5A and 5B.

In FIG. 5A, a first graph 500 depicts a status (axis 511) of a pulse 512 having the states ON (513) and OFF (514) versus time (axis 515) of a first gas delivered to the gas channel 112. Herein, similar to the graph in FIG. 4, the ON state relates to a state of established fluid communication between the respective gas channel and the valve chamber 108 and the OFF state relates to a period between pulses of gas from the same channel. Correspondingly, a second graph 520 depicts a status (axis 521) of a pulse 522 having the states ON (523) and OFF (524) versus time (axis 525) of a second gas delivered to the gas channel 114. Further, a third graph 530 depicts a status (axis 531) of a pulse 532 having the states ON (533) and OFF (534) versus time (axis 535) of a third gas delivered to the gas channel 116, and a fourth graph 540 depicts a status (axis 541) of a pulse 542 having the states ON (543) and OFF (544) versus time (axis 545) of a forth gas delivered to the gas channel 118.

The pulses 512, 522, 532, and 542 have a duration $T_1$ in the ON state. Periods 516, 526, 536, and 546 have a duration of $T_2$ and relate to the OFF state between pulses of gas from the same gas channel. Similarly, periods 517, 527, 537, and 547 have a duration $T_3$ and relate to gas cutoffs between pulses of gases from adjacent gas channels. In an alternative embodiment, at least one of such periods may have a different duration than the others as defined by a location of the outlets 154 along the circle 228, e.g., when the distances $\Delta L_{MN}$ vary, or by modulating the velocity of the selector disk 106.

In FIG. 5B, the pulses 512, 522, 532, and 542 overlap each other by periods 517, 527, 537, and 547, respectively. Similar to the timing diagrams in FIG. 5A, the overlapping periods have a duration of $T_3$. Similarly, in an alternative embodiment, at least one of such periods may have a different duration than the others, as discussed above in reference to FIG. 5A In one exemplary embodiment, the circle 228 has a length of 2 cm and the outlets of the gas channels and the timing slot 146 have a rectangular form factor. In this embodiment, the outlets have a largest width of 1 mm oriented perpendicular to the circle 228, a length of 3 mm, and a distance between the adjacent outlets of 5 mm. Further, a rectangular timing slot has width of 2 mm and a length of 3 mm, and rotates at a velocity of 4 revolution per second. The valve chamber 108 comprised an internal volume available to a pulsed gas of about 1 to 3 cm$^3$ and the outlet port 110 having a diameter of 5 mm. In this example, the valve 100 forms pulses of gas having a duration of 50 msec with a duration of cutoff period between pulses of gas of 12.5 msec.

In an alternative exemplary embodiment, when the timing slot 146 has the length of 5 mm, the pulses of gas that have a duration of 75 msec with a duration of a period of overlapping of the pulses from the adjacent channels of 12.5 msec.

In other exemplary embodiments, the length of the circle 228, the widths and lengths of the outlets and the timing slot, and a distance between the gas channels were in the ranges of about 10 to 50 mm, 1 to 5 mm, 1 to 10 mm, and 2 to 20 mm, respectively, and the velocity of rotation in a range of about 0.1 to 10 revolution per second. In the exemplary embodiments, the valve 100 produced pulses of gas having a duration of about 50 to 300 msec or longer and had a responsiveness of about 10 to 30 msec or less.

Those skilled in the art will realize that the valve 100 having a single timing slot 146 is illustrative of the invention. Multiple parallel slots, that are disposed within the selector disk 106 along the circles that are substantially concentric with the circle 228 and may couple a plurality of gas channels simultaneously, are also contemplated to be within the scope of the invention.

Figure 6:
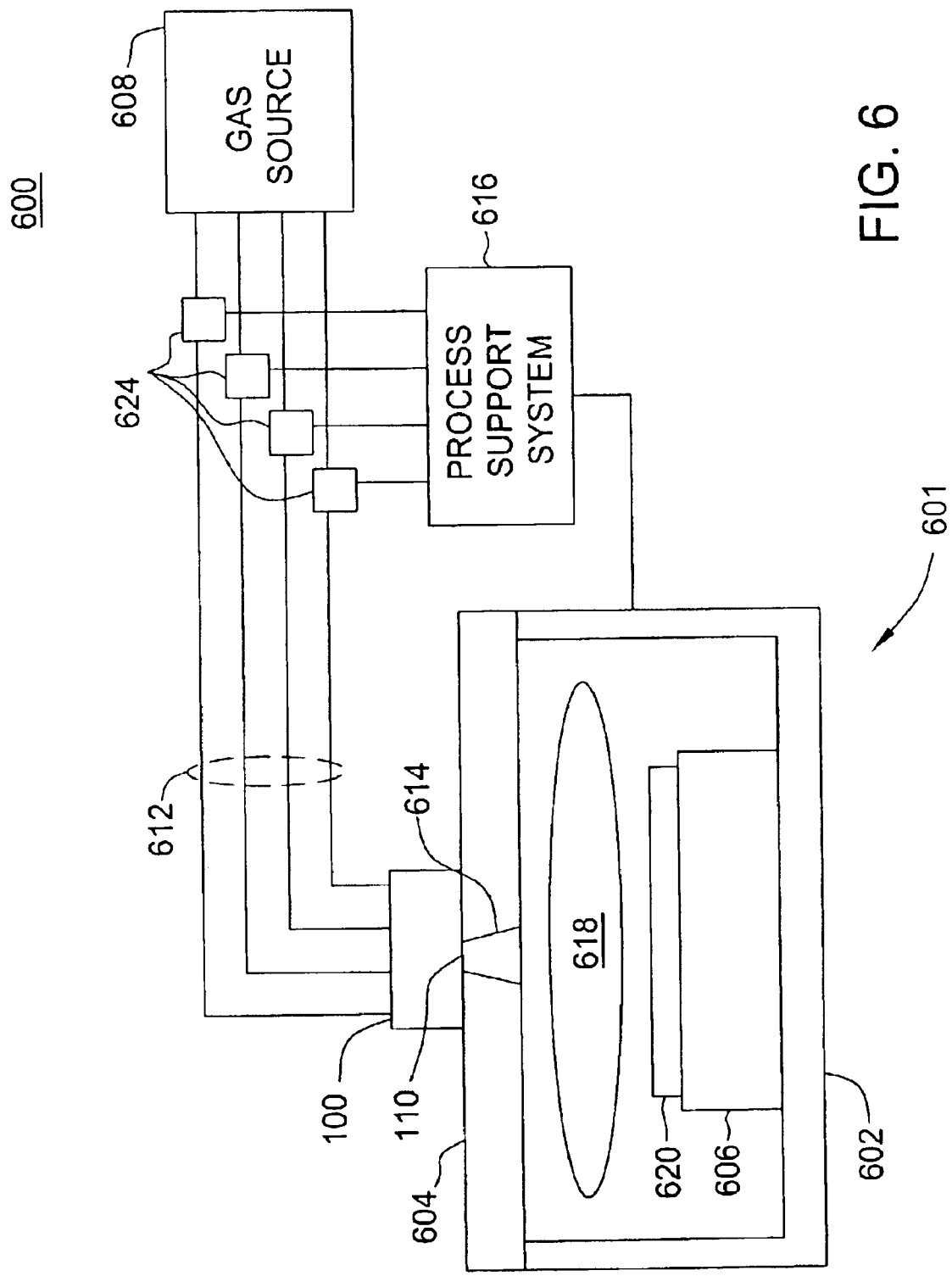
FIG. 6 is a schematic view of one example of an application for the gas valve of FIG. 1 as used in conjunction with a processing chamber of an ALD reactor.

FIG. 6 is a schematic, cross-sectional view of a deposition chamber 601 of a reactor of semiconductor substrate processing system 600 for performing a cyclical deposition process, e.g., an ALD reactor and the like. The chamber 601 comprises a lower portion 602 and an upper portion 604. The lower portion 602 comprises a pedestal 606 to support a substrate 620 (e.g., a silicon (Si) wafer) during processing. The lower portion 602 is coupled to a process support system 616 and the upper portion 604 is coupled to a gas source 608. The system 616 comprises means for controlling a temperature of the substrate, a gas pressure in the chamber 601, power supplies, and the like. The gas source 608 comprises the reactant and inert gases that are used during an ALD process and equipment for regulating a pressure and a flow of each gas.

The upper portion 604 encapsulates a reaction volume 618 above the substrate 620 and comprises a gas valve 100, and an intake port 614. The intake port 614 is used for the introduction of the reactant and purge gases into the deposition chamber 601. The intake port 614 generally is disposed above a center of the pedestal 606 and may comprise a showerhead or nozzle for distributing the gas proximate the substrate 620. The upper portion 604 is coupled to the gas source 608 using a plurality of vacuum-grade gas lines 612 that are chemically resistant to the gases being transported to the chamber 601. In operation, the outlets of the gas source 608 that relate to such gases are coupled to the respective inlet ports of the gas valve 100 using the gas lines 612, each comprising, in one embodiment, a controlled gas regulator 624, such as a shutoff valve, a mass flow controller (MFC), or a combination of the shutoff valve and MFC. As described above, the lines 612 are plumbed to the inlet ports of the gas valve 100 in an order that the respective gases should be delivered into the deposition chamber 601, with respect to the direction of rotary motion of the selector disk 106.

In one embodiment, the gas valve 100 is mounted upon the upper portion 604 in a manner that the outlet port 110 is aligned with the intake port 614. Thus, a volume of a flow path between the outlet 110 and the reaction volume 618 is minimized and a gas conductance of the flow path is maximized. As such, the flow path has a minimal impact on the form factor of the pulses of gas that are formed by the gas valve 100 and delivered into the chamber 601.

The gas valve 100 that is shown and described in reference to FIGS. 1–6 may be adapted for performing various deposition processes such as the ALD process or other form of a cyclical layer deposition process, a pulsed chemical vapor deposition, and the like. The ALD process generally uses, in a form of pulses having a duration of about 50 to 300 msec, reactive precursor, reducing agent, oxidizing agent, catalyst, inert, and the like gases. Each deposited layer may have a thickness less than a monolayer, as a monolayer, or greater than a monolayer of the respective material. Pulsing of the reactant gases may be repeated to deposit a plurality of such layers, each having a highly controlled thickness and forming an integral conformal film of a desired thickness. In exemplary applications, the gas valve 100 may be used in the deposition chamber 601 to form layers of nitrides, oxides, metals, organosilanes, organosiloxanes, dielectrics with either low or high dielectric constant, and the like.

In another exemplary application, when a process, e.g., the ALD process, uses two pulsed reactive precursor gases A and B and one pulsed inert gas C, the gases A and B are coupled to the inlets of the opposing gas channels, e.g., channels 112 and 116, respectively, and the gas C is coupled to the inlets of the gas channels 114 and 116. In such embodiment, a pulse of the inert gas C always follows a pulse of the reactive precursor gas A or B.

In one specific example, the deposition chamber 601 may be used to deposit a tantalum nitride (TaN) film. In this example, the chamber 601 comprises the gas valve 100 having a first inlet (e.g., an inlet of the gas channel 112) coupled to a source of a first reactant gas such as pentakis (dimethylaminor)tantalum (Ta(NMe$_2$)$_5$), a third inlet (e.g., an inlet of the gas channel 114) coupled to a source of a second reactant gas such as ammonia (NH$_3$), and a second and a fourth inlets (e.g., the inlets of the gas channels 114 and 118) coupled to a source of a purge gas such as argon (Ar) or helium (He).

Although the foregoing discussion referred to a gas valve for pulsing gases used a semiconductor substrate processing system, other applications wherein pulsed gases are employed can benefit from the invention. The invention can find a use in various apparatuses for performing accurate dosing or rapid pulsing of the gases and wherein the design parameters of the inventive gas valve may be adjusted to achieve acceptable characteristics by those skilled in the art by utilizing the teachings disclosed herein without departing from the spirit of the invention.

While foregoing is directed to the illustrative embodiment of the present invention, other and further embodiments of the invention may be devised without departing from the basic scope thereof, and the scope thereof is determined by the claims that follow.

What is claimed is:

1. A gas valve for pulsing a gas, comprising:
   a housing having at least one inlet port and an outlet port in fluid communication with a system for processing semiconductor substrates; and
   a selector disk mounted in the housing, comprising at least one timing slot, wherein rotation of the selector disk periodically couples the at least one inlet port to the outlet port through the timing slot.

2. The gas valve of claim 1, wherein the at least one timing slot and at least one inlet port are positioned along circumferences of equal radii.

3. The gas valve of claim 1, wherein the at least one timing slot has a length that is less than a distance between two adjacent inlet ports.

4. The gas valve of claim 1, wherein the at least one timing slot has a length that is equal to or greater than a distance between two adjacent inlet ports.

5. The gas valve of claim 1, wherein the at least one timing slot has a substantially rectangular form factor with a smallest width positioned orthogonal to a direction of rotation of the selector disk.

6. The gas valve of claim 1 further comprising an actuator assembly for rotating the selector disk.

7. The gas valve of claim 6, wherein the actuator assembly comprises a shaft coupled to the selector disk and a bias member located between the shaft and the housing to bias the disk against the housing.

8. The gas valve of claim 7, wherein the bias member exerts an expanding elastic force.

9. The gas valve of claim 7, wherein the actuator assembly defines the angular position of the selector disk.

10. The gas valve of claim 1, wherein the selector disk forms a vacuum-tight coupling with the housing.

11. The gas valve of claim 1, wherein the housing has an internal volume for the gas between the selector disk and the outlet port of about 1 to 3 cm$^3$.

12. A system for processing semiconductor substrates comprising:
    a processing chamber;
    a source of at least one pressurized reactant or inert gas; and
    a gas valve for pulsing a gas, comprising:
    a housing having at least one inlet port and an outlet port in fluid communication with a system for processing semiconductor substrates; and
    a selector disk mounted in the housing, comprising at least one timing slot, wherein rotation of the selector disk periodically couples the at least one inlet port to the outlet port through the timing slot.

13. The system of claim 12, wherein the at least one timing slot and at least one inlet port are positioned along concentric circumferences of equal radii.

14. The system of claim 12, wherein the at least one timing slot has a length that is less than a distance between two adjacent inlet ports.

15. The system of claim 12, wherein the at least one timing slot has a length that is equal to or greater than a distance between two adjacent inlet ports.

16. The system of claim 12, wherein the at least one timing slot has a substantially rectangular form factor with a smallest width positioned orthogonal to a direction of rotation of the selector disk.

17. The system of claim 12 further comprising an actuator assembly for rotating the selector disk.

18. The system of claim 17, wherein the actuator assembly comprises a shaft coupled to the selector disk and a bias member located between the shaft and the housing to bias the disk against the housing.

19. The system of claim 18, wherein the bias member exerts an expanding elastic force.

20. The system of claim 18, wherein the actuator assembly defines the angular position of the selector disk.

21. The system of claim 12, wherein the selector disk forms a vacuum-tight coupling with the housing.

22. The system of claim 12, wherein the housing has an internal volume for the gas between the selector disk and the outlet port of about 1 to 3 cm$^3$.

23. A method of producing pulses of a gas having a specific pulse profile, comprising:
    providing a gas valve for pulsing a gas, comprising:
    a housing having at least one inlet port and an outlet port in fluid communication with a system for processing semiconductor substrates; and
    a selector disk mounted in the housing, comprising at least one timing slot, wherein rotation of the selector disk periodically couples the at least one inlet port to the outlet port through the timing slot; and
    modulating angular velocity of the rotation when the at least one timing slot passes the at least one inlet port.

24. The method of claim 23, wherein the modulating angular velocity increases the velocity to decrease a duration of the pulses.

25. The method of claim 23, wherein the modulating angular velocity increases the velocity to decrease a duration of leading and trailing edges of the pulses.

26. The method of claim 23, wherein the modulating angular velocity decreases the velocity to increase a duration of the pulses.

27. The method of claim 23, wherein the modulating angular velocity decreases the velocity to increase a duration of leading and trailing edges of the pulses.

28. The method of claim 23, wherein the modulating angular velocity applies the same velocity when the at least one timing slot passes any inlet port.

29. The method of claim 23, wherein the modulating angular velocity applies various the velocities when the at least one timing slot passes the at least one inlet port.

* * * * *

UNITED STATES PATENT AND TRADEMARK OFFICE
CERTIFICATE OF CORRECTION

PATENT NO. : 6,868,859 B2
DATED : January 29, 2003
INVENTOR(S) : Joseph Yudovsky It is certified that error appears in the above-identified patent and that said Letters Patent is hereby corrected as shown below:

Column 3,
Line 67, remove "$(NH_4)$".

Column 4,
Line 8, remove "$(NH_4)$".

Column 8,
Line 47, change "forth" to --fourth --.

Column 12,
Line 48, remove first occurrence of "the".

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,868,859 B2  Page 1 of 1
DATED : March 22, 2005
INVENTOR(S) : Joseph Yudovsky It is certified that error appears in the above-identified patent and that said Letters Patent is hereby corrected as shown below:

Column 3,
Line 67, remove "$(NH_4)$".

Column 4,
Line 8, remove "$(NH_4)$".

Column 8,
Line 47, change "forth" to --fourth --.

Column 12,
Line 48, remove first occurrence of "the".

This certificate supersedes Certificate of Correction issued April 4, 2006.

Signed and Sealed this

Twenty-fifth Day of April, 2006

JON W. DUDAS
*Director of the United States Patent and Trademark Office*